United States Patent [19]
Patterson

[11] Patent Number: 5,635,038
[45] Date of Patent: Jun. 3, 1997

[54] SYSTEM FOR ELECTROLYSIS AND HEATING OF WATER

[76] Inventor: James A. Patterson, 2074 20th St., Sarasota, Fla. 34234

[21] Appl. No.: 606,570

[22] Filed: Feb. 26, 1996

Related U.S. Application Data

[63] Continuation of Ser. No. 488,609, Jun. 8, 1995, Pat. No. 5,494,559.

[51] Int. Cl.$^6$ ............................. C25B 9/00; C25B 15/08
[52] U.S. Cl. ............... 204/222; 204/273; 204/275; 204/284; 204/290 R; 204/290 F
[58] Field of Search ..................... 204/222, 273, 204/275, 284, 290 R, 290 F, 223

[56] References Cited

U.S. PATENT DOCUMENTS

| | | |
|---|---|---|
| 3,632,496 | 1/1972 | Patterson . |
| 3,888,756 | 6/1975 | Teshima et al. ............ 204/275 |
| 4,269,689 | 5/1981 | Agladze et al. ............ 204/268 |
| 4,316,786 | 2/1982 | Yu et al. ................. 204/223 |
| 4,913,779 | 4/1990 | LaCoste ................. 205/348 |
| 4,943,355 | 7/1990 | Patterson . |
| 5,036,031 | 7/1991 | Patterson . |
| 5,318,675 | 6/1994 | Patterson . |
| 5,372,688 | 12/1994 | Patterson . |

*Primary Examiner*—Donald R. Valentine
*Attorney, Agent, or Firm*—Charles J. Prescott

[57] ABSTRACT

An electrolytic cell and system for electrolysizing and/or heating a liquid electrolyte containing water having a conductive salt in solution flowing through the cell. The electrolytic cell includes a non-conductive housing having an inlet and an outlet and spaced apart first and second conductive foraminous grids connected within the housing. A plurality of cross linked polymer microspheres each having improved conductive exterior multi-layers of uniform thickness are positioned within the housing in electrical contact with the first grid adjacent the inlet. The conductive microspheres are plated first with a metal cation which will reduce with hydrazine to form a conductive metal flash coating. The microspheres are then plated with a uniform layer of nickel, followed by plated layer of metallic hydride which is readily combineable with hydrogen or an isotope of hydrogen, then a uniform metallic support plating having a high hydrogen diffusion rate and a low hydride formation ratio. An electric power source in the system is operably connected across the first and second grids whereby electrical current flows between the grids within the liquid electrolyte.

24 Claims, 2 Drawing Sheets

SYSTEM FOR ELECTROLYSIS AND HEATING OF WATER

This is a continuation application of Ser. No. 08/488,609 filed on Jun. 8, 1995 now U.S. Pat. No. 5,494,559.

BACKGROUND OF THE INVENTION

1. Scope of Invention

This invention generally relates to electrolytic cells, and more particularly to an improved electrolytic cell for electrolysis of water and the production of heat.

2. Prior Art

The present invention utilizes and improves upon microspheres formed of non-metallic beads which are plated with a uniformly thick coating of palladium. These palladium coated microspheres are taught in my previous U.S. Pat. Nos. 4,943,355 and 5,036,031. In these above-recited previous patents, cross linked polymer microspheres having a plating of palladium are taught to exhibit improvements in the absorption of hydrogen and isotopes of hydrogen. Utilizing these catalytic microspheres led to my later U.S. Pat. Nos. 5,318,675 ('675) and 5,372,688 ('688) (incorporated herein by reference) which teach an electrolytic cell and system for, inter alia, producing heat.

The use of a palladium sheet to form one electrode within an electrolytic cell to produce excess heat, the electrolytic cell being a Pons-Fleischmann-type is taught by Edmund Storms. The description of the Storms electrolytic cell and his experimental performance results are described in an article entitled *Measurements of Excess Heat from a Pons-Fleischmann-Type Electroltic Cell Using Palladium Sheet* appearing in Fusion Technology, Volume 3, March 1993. In a previous article, Storms reviewed experimental observations about electrolytic cells for producing heat in an article entitled "Review of Experimental Observations About the Cold Fusion Effect" FUSION TECHNOLOGY, Vol. 20, December 1991.

None of the previously reported experimental results or other prior art devices known to applicant other than my U.S. '675 and '688 patents have utilized or disclosed non-conductive copolymeric beads of palladium coated (or any substitute metal which will form "metallic hydrides" in the presence of hydrogen) conductive microspheres within an electrolytic cell for the production of heat and the electrolysis of water into its hydrogen and oxygen components. The present invention discloses various improved embodiments of preferably palladium/nickel coated microspheres within an electrolytic cell in conjunction with an electrolytic media containing either water or heavy water, particularly deuterium. These improved microspheres are the subject of my co-pending U.S. application entitled "Improved Uniformly Plated Microsphere Catalyst", Ser. No. 08/462,005, filed Jun. 5, 1995 now U.S. Pat. No. 5,580,838.

BRIEF SUMMARY OF THE INVENTION

This invention is directed to an electrolytic cell for electrolysizing water containing a conductive salt in solution and for producing heat. The electrolytic cell includes a non-conductive housing having an inlet and an outlet and spaced apart first and second Conductive foraminous grids positioned within the housing. A plurality of non-conductive polymeric beads each having a conductive uniform preferably palladium plating over a nickel plating and an outer preferably nickel plating thereon are positioned within the housing in electrical contact with the first grid adjacent the inlet. An electric power source is operably connected across the first and second grids whereby electrical current flows between the grids within the water solution.

It is therefore an object of this invention to utilize preferably palladium coated microspheres as previously disclosed in my '675 and '688 patents in combination with the multi-layer arrangement of my referenced co-pending U.S. application for the production of either hydrogen and oxygen and/or heat.

It is another object of this invention to provide a variety of cathode constructions utilizing improved palladium/nickel coated microspheres within an electrolytic cell.

It is yet another object of this invention to provide an improved electrolytic cell for the increased production of heat in the form of heated water or heavy water-based electrolyte exiting the cell.

It is yet another object of this invention to utilize metal coated conductive microspheres in an electrolytic cell, the metal chosen from those which exhibit strong hydrogen absorption properties to form "metallic hydrides" and structurally supported by one or more adjacent uniform support plates.

It is another object of this invention to provide an electrolytic cell for electrolysizing water and/or producing heat which is fault tolerant and having a long mean operating time to failure, if at all.

In accordance with these and other objects which will become apparent hereinafter, the instant invention will now be described with reference to the accompanying drawings.

DETAILED DESCRIPTION OF THE INVENTION

My prior U.S. Pat. Nos. 5,318,675 (U.S. '675) and 5,372,688 (U.S. '688) and the teachings contained therein are hereby incorporated by reference.

Figure 2:
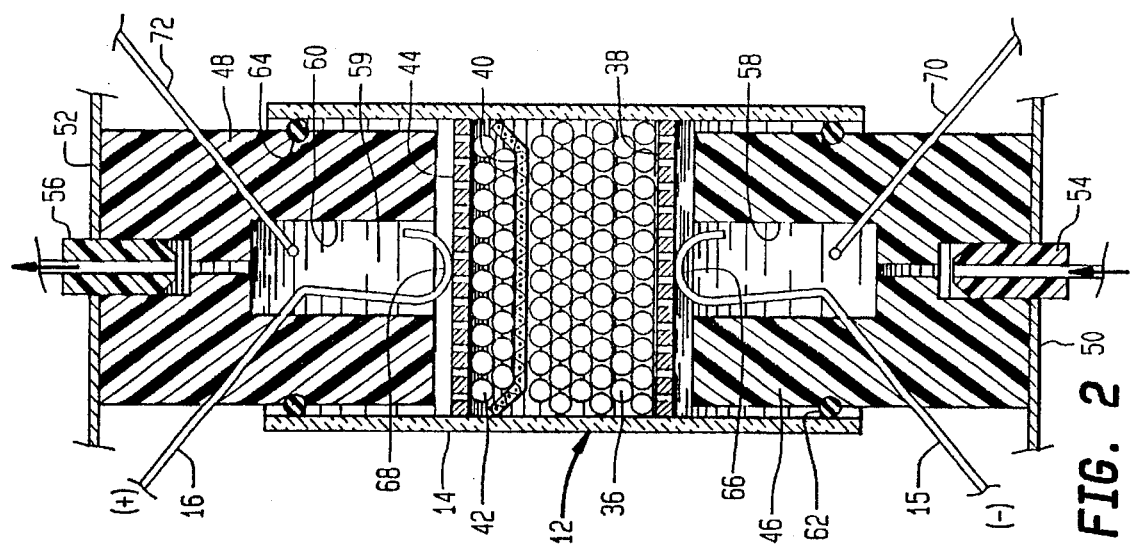
FIG. 2 is a section view of the electrolytic cell shown in FIG. 1.
Figure 1:
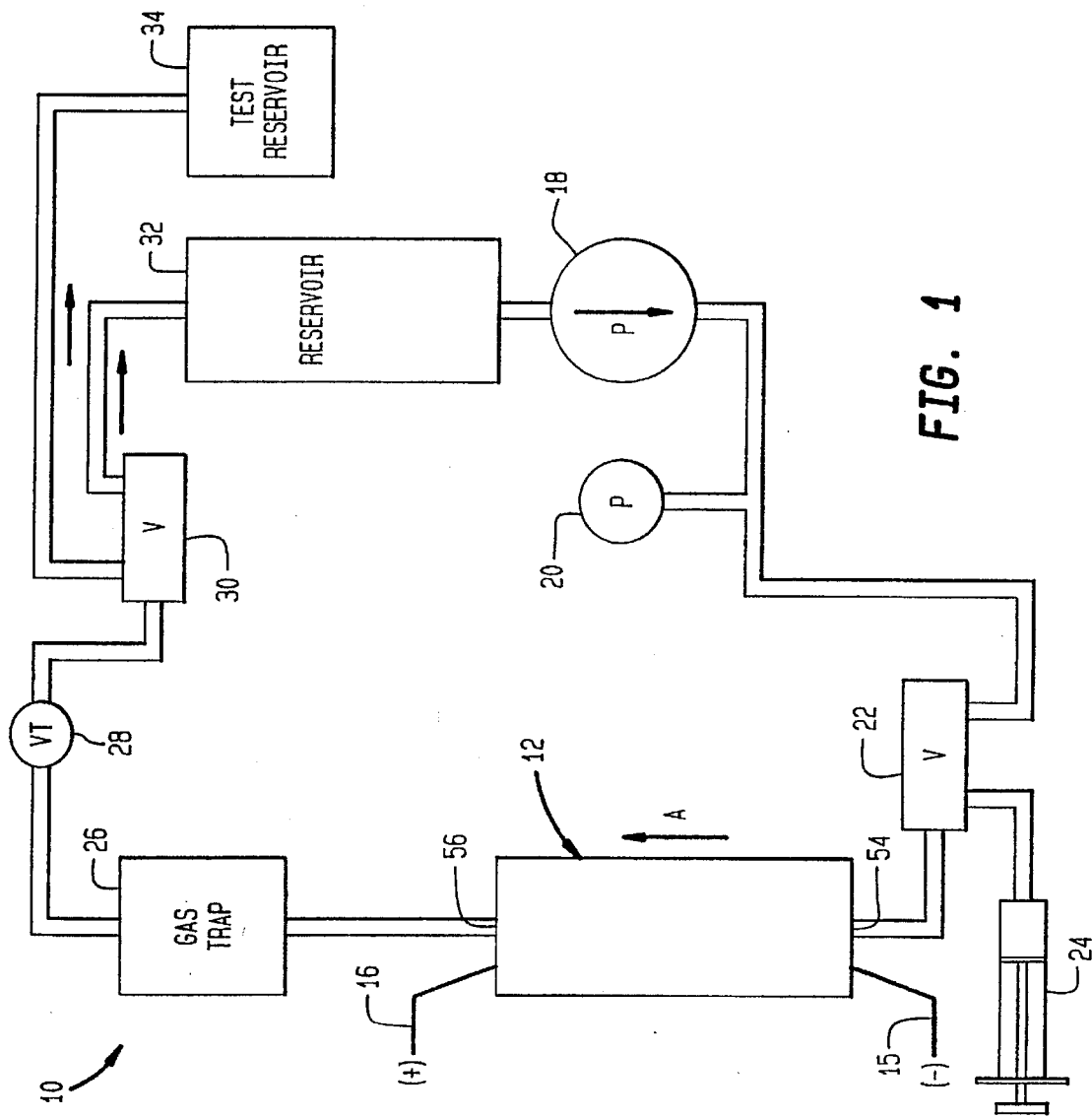
FIG. 1 is a schematic view of an experimental system embodying the present invention.

Referring now to the drawings, and particularly to FIGS. 1 and 2, a system embodying concepts of the invention utilized during testing procedures is shown generally at numeral 10. This system 10 includes an electrolytic cell shown generally at numeral 12 interconnected at each end with a closed loop electrolyte circulation system. The circulation system includes a pump 18 which draws a liquid electrolyte 59 from a reservoir 32 and forces the electrolyte 59 in the direction of the arrow into inlet 54 of electrolytic cell 12. This pump 18 is a constant volume pump. After the electrolytic cell 12 is completely filled with the electrolyte 59, the fluid then exits an outlet 56, then flowing into a gas trap 26 which is provided to separate hydrogen and oxygen gas from the electrolyte 59 when required. A throttle valve 28 downstream of the gas trap 26 regulate the electrolyte flow so as to also regulate the fluid pressure within the electrolytic cell 12 as monitored by pressure gauge 20.

A slide valve 22 provides for the intermittent introduction of ingredients into the liquid electrolyte 59 via syringe 24. A second slide valve 30 provides for the periodic removal of electrolyte 59 into test reservoir 34 for analysis to determine correct electrolyte make-up.

In FIG. 2, the details of the electrolytic cell 12 utilized during testing procedures is there shown. A cylindrical glass non-conductive housing 14, open at each end, includes a moveable non-conductive end member 46 and 48 at each end thereof. These end members 46 and 48 are sealed within the housing 14 by O-rings 62 and 64. The relative spacing between these end members 46 and 48 is controlled by the movement of end plates 50 and 52 thereagainst.

Each of the end members 46 and 48 includes an inlet stopper 54 and an outlet stopper 56, respectively. Each of these stoppers 54 and 56 define an inlet and an outlet passage, respectively into and out of the interior volume, respectively, of the electrolytic cell 12. These end members 46 and 48 also include a fluid chamber 58 and 60, respectively within which are mounted electrodes 15 and 16, respectively, which extend from these chambers 58 and 60 to the exterior of the electrolytic cell 12 for interconnection to a d.c. power supply (not shown) having its negative and positive terminals connected as shown. This d.c. power supply is a constant current type.

Also positioned within the chambers 58 and 60 are thermocouples 70 and 72 for monitoring the electrolyte temperature at these points of inlet and outlet of the electrolytic cell 12.

A plurality of conductive microspheres 36 are positioned within housing 14 immediately adjacent and against a conductive foraminous grid 38 formed of platinum and positioned transversely across the housing 14 as shown. These conductive microspheres 36 are formed of non-conductive inner polymer beads and include a uniform palladium plating layer. The preferred size of these conductive microspheres are in the range of 1.0 mm or less in diameter and the details of the manufacture of these conductive microspheres 36 are generally taught in my previous U.S. Pat. Nos. 4,943,355 and 5,036,031. My co-pending U.S. application Ser. No. 08/462,005, filed on Jun. 5, 1995, now U.S. Pat. No. 5,580,838 entitled "Improved Uniformly Plated Microsphere Catalyst", incorporated herein by reference, discloses the broad details of this improved conductive microsphere. These improved conductive microspheres 36 preferably include an inner nickel plate atop a metallic flash coat, a preferably palladium plate atop the inner nickel plate, and a support plate atop the palladium, preferably nickel.

In the previously reported testing in U.S. '675 and '688, an intermediate layer of nickel was alternately added over a copper flash coat beneath the palladium plate. The nickel intermediate layer, producing a mean microsphere density of 1.51 g/cm$^3$, was positioned immediately beneath the palladium plated layer to increase the density of the conductive microspheres 36. In this testing, a black residue developed within the liquid electrolyte which was subsequently analyzed and determined to be palladium. Further investigation showed that the outer palladium coat of these previous original microspheres, being subjected to both a heat and electrical current duty cycle, either flaked, spalled and/or incurred minor cracking of the palladium plate. This in-service deterioration both shortened the useful life of the previously described cell and its efficiency in producing heat.

Still referring to FIG. 2, a non-conducive foraminous nylon mesh 40 is positioned against the other end of these conductive microspheres 36 so as to retain them in the position shown. Adjacent the opposite surface of this non-conductive mesh 40 is a plurality of non-conductive spherical microbeads 42 formed of cross-linked polystyrene and having a uniform diameter of about 1.0 mm. Against the other surface of this layer of non-conductive microspheres 42 is a conductive foraminous grid 44 positioned transversely across the housing 14 as shown.

Should the system 10 boil off or otherwise inadvertently lose all liquid electrolyte within the cell 12, a means of preventing system shut-down is preferred which replaces the non-conductive microspheres 42 with non-metallic spherical cation ion exchange polymer conductive microbeads preferably made of cross-linked styrene divinyl benzene which have fully sulfonated surfaces which have been ion exchanged with a lithium salt. This preferred non-metallic conductive microbead structure will thus form a salt bridge between the anode 44 and the conductive microspheres 36, the non-conductive mesh 40 having apertures sufficiently large to permit contact between the conductive microspheres 36 and the conductive non-metallic microbeads. The mesh size of mesh 40 is 200–500 micrometers. This preferred embodiment also prevents melting of the replaced non-conductive microbeads 42 while reducing cell resistance during high loading and normal operation.

The end of the electrode 15 is in electrical contact at 66 with conductive grid 38, while electrode 16 is in electrical contact at 68 with conductive grid 44 as shown. By this arrangement, when there is no electrolyte within the electrolytic cell 12, no current will flow between the electrodes 15 and 16.

ELECTROLYTE

When the electrolytic cell 12 is filled with a liquid electrolyte 59, current will flow between the electrodes 15 and 16. The preferred formulation for this electrolyte 59 is generally that of a conductive salt in solution with water. The preferred embodiment of water is that of either light water ($H_2^1O$) or heavy water and more specifically that of deuterium ($H_2^2O$). The purity of all of the electrolyte components is of utmost importance. The water ($H_2^1O$) and the deuterium ($H_2^2O$) must have a minimum resistance of one megohm with a turbidity of less than 0.2 n.t.u. This turbidity is controlled by ultra membrane filtration. The preferred salt solution is lithium sulfate ($Li_2SO_4$) in a 2-molar mixture with water and is of chemically pure quality. In general, although a lithium sulfate is preferred, other conductive salts chosen from the group containing boron, aluminum, gallium, and thallium, as well as lithium, may be utilized. The preferred pH or acidity of the electrolyte is 9.0.

CONDUCTIVE BEADS

Palladium coated microspheres were originally preferred as disclosed in U.S. Pat. Nos. '675 and '688. However, palladium may be substituted by other transition metals, rare earths and also uranium. In general, any of these metals which are capable of combining with high volumes of hydrogen to form "metallic hydrides" are acceptable. These metals known to applicant which will serve as a substitute for palladium are lanthanum, praseodymium, cerium, titanium, zirconium, vanadium, tantalum, uranium, hafnium and thorium. Authority for the inclusion of these elements within this group is found in a book entitled "*Inorganic Hydrides*", by B. L. Shaw, published by Pergammon Press, 1967. However, palladium is the best known and most widely studied metallic hydride and was utilized in my previously referenced patents to form conductive hydrogen-absorbing microspheres. In an even more general sense, the broad requirement here is to provide a "metallic hydride" surface, the makeup of the core of the microspheres being a secondary consideration.

ALTERNATE EMBODIMENTS

Figure 3:
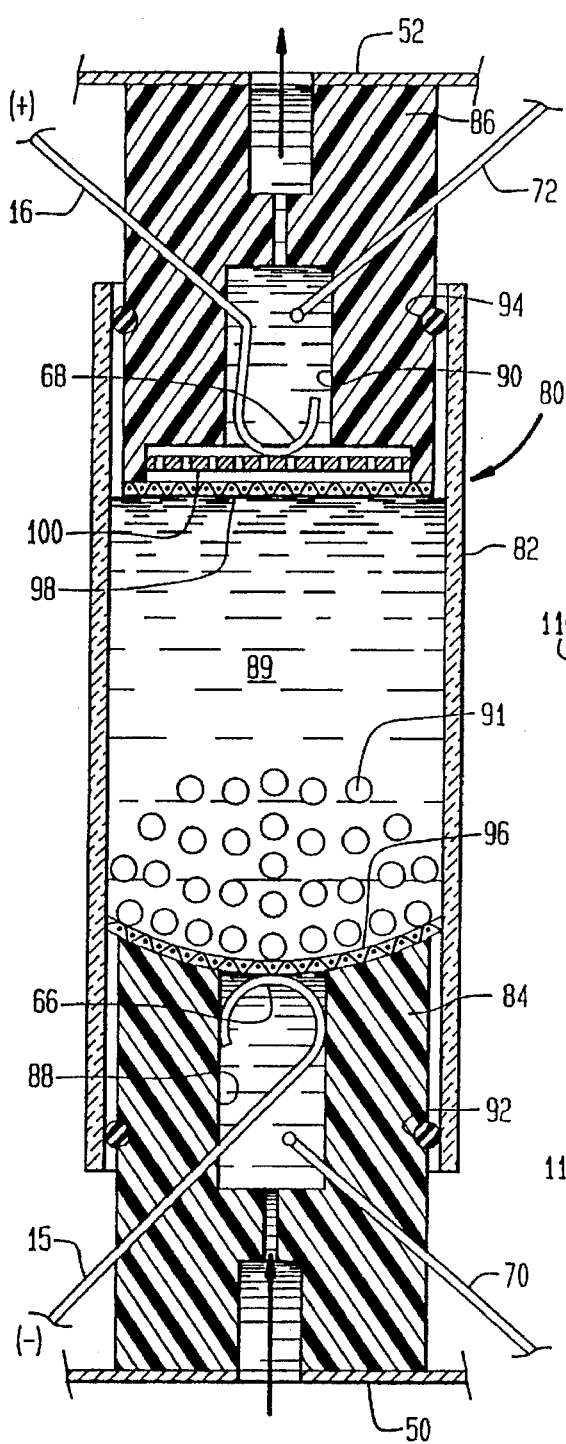
FIG. 3 is a section view of another embodiment of the electrolytic cell during flow of an electrolyte therethrough.
Figure 4:
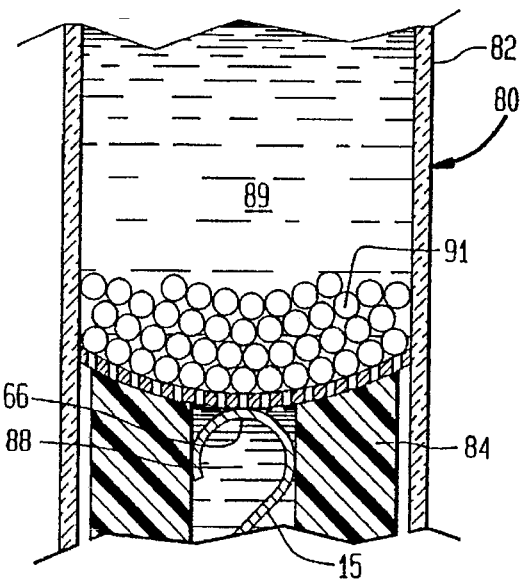
FIG. 4 is a partial section view of FIG. 3 with the electrolytic cell at rest.

Referring now to FIGS. 3 and 4, an alternate embodiment of the electrolytic cell 80 is there shown. In this embodiment 80, a non-conductive glass cylindrical housing 82 is again utilized with non-metallic delrin end members 84 and 86 sealably engaged by O-rings 92 and 94 within the ends of housing 82. Inlet and outlet chambers 88 and 90, respectively are formed into the end members 84 and 86, respectively, end member 84 defining an inlet end, while end member 86 defines an outlet end of the electrolytic cell 80.

A plurality of conductive microspheres 91 formed of a palladium coating over non-metallic beads having a first conductive copper layer and an intermediate nickel layer as previously described are disposed against a concave foraminous conductive grid 96 formed of platinum which is, in turn, disposed against the inner end of end member 84 as shown. An electrode 16 is in electrical contact with the conductive grid 96 within inlet chamber 88 as shown. A thermocouple 70 monitors the temperature of the electrolyte 89 flowing into inlet chamber 88. These conductive microspheres 91 are loosely packed whereby, when the electrolyte 89 flows in the direction of the arrows through the electrolytic cell 80 as shown in FIG. 3, they raise above the upright housing 82 so as to be spaced upwardly toward a non-conductive foraminous nylon mesh 98 positioned adjacent the inner end of end member 86. Thus, by controlling the flow rate of the electrolyte 89, the spread or spacing between the conductive microspheres 91 and the degree of movement or agitation is regulated. Although the loose microspheres 91 roll and mix about, electrical contact is maintained therebetween.

A second conductive foraminous platinum grid 100 is positioned between the non-conductive mesh 98 and end member 86 in electrical contact with another electrode 15 at 68. A thermocouple 72 monitors the temperature of the electrolyte 89 as it flows out of the electrolytic cell 80.

As previously described, the end members 84 and 86 are movable toward one another within housing 82 by pressure exerted against plates 50 and 52. This end member movement serves to regulate the volume of the electrolyte 89 within the electrolytic cell 80.

The conductive beads 91 shown in FIG. 4 are shown in their at-rest position during which very little, if any, electrolyte flow is occurring through the electrolytic cell 82.

Figure 5:
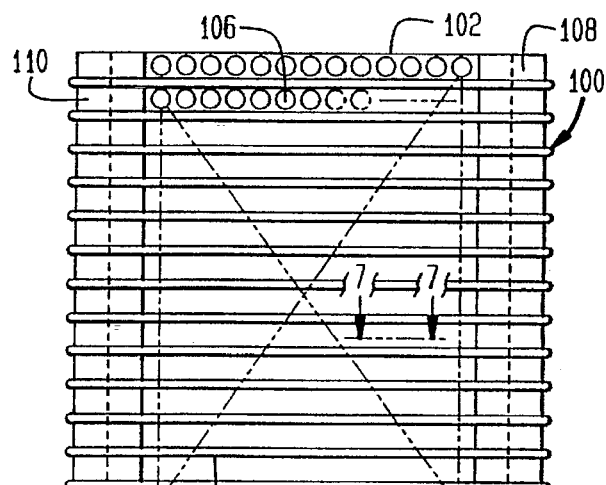
FIG. 5 is yet another embodiment of the combined anode and cathode of an electrolytic cell of the present invention.
Figure 6:
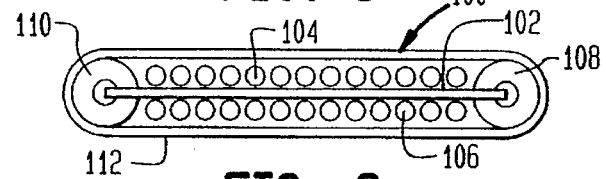
FIG. 6 is an end view of FIG. 5.
Figure 7:
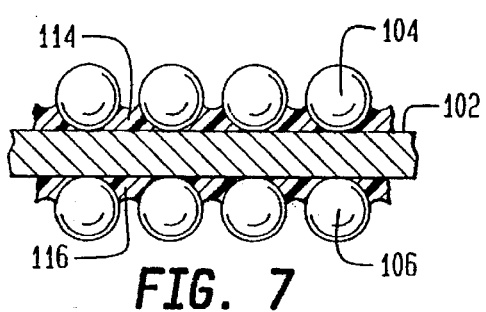
FIG. 7 is an enlarged section view in the direction of arrows 7—7 in FIG. 5.

Referring now to FIGS. 5, 6 and 7, another embodiment of the conductive grids is there shown. A conductive plate 102 formed of silver plated metal having the conductive microspheres 104 and 106 epoxy (non-conductive) bonded at 114 and 116 to the conductive plate 102 is utilized to define the cathode of the electrolytic cell. Thus, the only exposed conductive surface in the cathode is that of the conductive microspheres 104. Non-conductive split polyethylene tubes 108 and 110 extend along the opposing edges of conductive plate 102, around which are wound a plurality of conductive wire bands 112 formed of platinum plated silver wire 0.1 cm in diameter. By this arrangement, the electrolyte may flow along the length of the conductive plate 102 and conductive microspheres 104 to form the necessary electrolytic current flow path between the conductive plate 102 (cathode) and the conductive wire bands 112 (anode), all of the conductive bands 112 being in electrical contact with the positive (+) side of the d.c. power supply (not shown), while the conductive plate 102 being in electrical communication with the negative (−) terminal of that power supply.

EXPERIMENTAL RESULTS/VERIFICATION

Experimental test procedures and results and graphic display of those results from my previous U.S. Pat. Nos. '675 and '688 are repeated by reference thereto. Similar tests with respect to the new multi-layer conductive microspheres were conducted which showed substantially above 100% heat outputs (yields), also referred to as "excess heat". Excess heat is more generally defined herein as the ratio (greater than 1.0) of heat energy output to electrical power input.

Independent verification of my previous experimental procedures and reliability, repeatability and heat output performance of a prototype of one embodiment of my improved system and cell were conducted and reported by Dr. Dennis Cravens, who is currently a professor at Vernon Regional Junior College in physics, chemistry, math and microbiology and Department Chairperson of Math and Science and a consultant to Los Alamos National Laboratory. This testing verification occurred in two separate experimental procedures. The first was conducted at my lab on Feb. 25–26, 1995 on a system and cell which I had previously set up. The second procedure was independently conducted at Dr. Craven's lab where he had complete charge of equipment set-up and operation. The embodiment verified was that of a cell having conductive microspheres of nickel/palladium/nickel composition.

The results of this independent verification were reported during a presentation, accompanied by presentation material entitled "Flow Colorimetry and the Patterson Power Cell Design" dated Apr. 10, 1995 at the 5th Annual International Conference on Cold Fusion in Monte-Carlo, Monaco. These presentation materials are attached hereto as Exhibit A.

The text describing those experimental verification results was separately reported by Dr. Cravens in a published report entitled "Flowing Electrolyte Colorimetry" dated May 1, 1995 attached hereto as Exhibit B. In Exhibit B, Dr. Cravens reports that, during the I.C.C.F.-5 conference which I attended, this same improved prototype embodiment of my invention (nickel-palladium-nickel plated microspheres) was in continuous operational display producing excess heat. Several conference attenders were witness to this display who actually took data which clearly depicted continuous production of excess heat by the prototype. Table A of Exhibit A summarizes those witnessed results.

Bruce Klein, a recognized authority in this field working for Bechtel Corp., was present and participated in the first verification procedure at my lab with Dr. Cravens. Mr. Klein separately prepared his very favorable written verification report dated Mar. 4, 1995 (not included).

CELL RESISTANCE

In preparing the electrolytic cells for testing, the cell resistance utilizing a Whetstone Bridge was utilized prior to the introduction of the electrolyte into the electrolytic cell. This cell resistance, when dry, should be infinitely high. Otherwise, a short between the anode screen and the cathode beads exists and the unit would have to be repacked. Prior to testing, with electrolyte present, the cell resistance was set at 16 ohms by appropriate compression of the end members.

While the instant invention has been shown and described herein in what are conceived to be the most practical and preferred embodiments, it is recognized that departures may be made therefrom within the scope of the invention, which is therefore not to be limited to the details disclosed herein, but is to be afforded the full scope of the claims so as to embrace any and all equivalent apparatus and articles.

What is claimed is:

1. A system for producing excess heat in a liquid electrolyte for separate external use comprising:

an electrolytic cell including a non-conductive housing and an inlet and an outlet;

a plurality of conductive beads each including:
      a non-conductive core having a hydrophilic surface;
      a first metallic support layer of substantially uniform thickness formed atop said non-conductive core;
      a metallic hydride forming layer of substantially uniform thickness formed atop said first metallic support layer, said metallic hydride forming layer combining with hydrogen or an isotope of hydrogen during operation of said system, to form a metallic hydride,
      a second metallic support layer of substantially uniform thickness formed atop said metallic hydride forming layer, said second metallic support layer having a relatively high hydrogen diffusion rate and a relatively low hydride formation ratio;

a first conductive grid means for defining one surface of, and in electrical communication with, said plurality of conductive beads which is positioned closer to said inlet;

a second conductive grid means electrically spaced from, and for defining another surface of said plurality of conductive beads which is positioned closer to said outlet;

means for pumping said liquid electrolyte into said electrolytic cell through said inlet, said electrolyte having a conductive salt in solution with water, said outlet providing an egress for said liquid electrolyte: and an electric power source having terminals operably connected to said first and second conductive grid means.

2. A system as set forth in claim 1, further comprising:

a conductive metal flash coating of substantially uniform thickness formed atop said non-conductive core and beneath and prior to forming said first metallic support layer.

3. A system as set forth in claim 2, wherein each said conductive bead further includes:

a metallic stabilizer layer of substantially uniform thickness formed atop said second metallic support layer, said stabilizer layer being a transition metal capable of a relatively high rate of hydrogen diffusion and a relatively low hydride formation ratio.

4. A system as set forth in claim 3, wherein:

said flash coating has a thickness in the range of 1 to 10 angstroms;

said first and second metallic support layers each have a thickness in the range of about 10 angstroms to 1 micron;

said metallic hydride forming layer has a thickness in the range of about 10 angstroms to 2 microns;

said stabilizer layer has a thickness in the range of about 1 to 60 angstroms.

5. A system as set forth in claim 3, wherein:

said flash coating is taken from the group consisting of: copper, palladium, nickel and titanium;

said metallic hydride forming layer is taken from the group consisting of:
      palladium, lanthanum, praseodymium, cerium, titanium, zirconium, vanadium, tantalum, uranium, hafnium and thorium;

said first and second support layers are each taken from the group consisting of:
      nickel, gold, silver and titanium; and said stabilizer layer is taken from the group consisting of:
      chromium, iron, cobalt, nickel and platinum.

6. A system as set forth in claim 1, wherein said electrolytic cell further comprises:

a plurality of non-conductive beads positioned within said housing adjacent said second conductive grid means;

a foraminous non-conductive mesh means positioned within said housing between said conductive beads and said non-conductive beads for preventing said conductive beads from contacting said second conductive grid means.

7. A system as set forth in claim 1, wherein said electrolytic cell further comprises:

a foraminous non-conductive mesh means positioned within said housing adjacent to and spaced from said second conductive grid means for preventing said conductive beads from contacting said second conductive grid means, said conductive beads being loosely packed within said electrolytic cell.

8. A system as set forth in claim 7, wherein:

said pumping means causes said liquid electrolyte to flow at a flow rate;

said conductive beads have an at-rest position when said flow rate is at or near zero;

said conductive beads are spaced apart and agitated at a rate proportional to said flow rate.

9. A system as set forth in claim 1, wherein said electrolytic cell further comprises:

a conductive plate positioned within said housing defining said first conductive grid means;

said conductive beads are adhered against and in electrical communication with said conductive plate;

a non-conductive spacer connected along two opposing edges of said conductive plate;

a plurality of conductive wire bands each connected around said spacers and defining said second electrode, said wire bands in electrical isolation from said conductive beads and said conductive plate.

10. A system as set forth in claim 1, wherein:

each said conductive bead is sized in the range of about 1 mm or less in diameter.

11. A system as set forth in claim 1, wherein:

said metallic hydride layer is taken from the group consisting of:
       palladium, lanthanum, praseodymium, cerium, titanium, zirconium, vanadium, tantalum, uranium, hafnium and thorium.

12. A system as set forth in claim 1, further comprising:

a plurality of non-metallic beads each having ion exchange properties;

said plurality of non-metallic beads positioned between said second conductive grid means and said plurality of conductive beads;

said plurality of non-metallic beads forming a conductive salt bridge thereacross.

13. An electrolytic cell for producing excess heat in a liquid electrolyte for separate external use comprising:

a non-conductive housing having an inlet and an outlet;

a plurality of conductive beads each including:
       a non-conductive core having a hydrophilic surface;
       a first metallic support layer of substantially uniform thickness formed atop said non-conductive core;

a metallic hydride forming layer of substantially uniform thickness formed atop said first metallic support layer, said metallic hydride plating combining with hydrogen or an isotope of hydrogen to form a metallic hydride;

a second metallic support layer of substantially uniform thickness formed atop said metallic hydride forming layer, said second metallic support layer having a relatively high hydrogen diffusion rate and a relatively low hydride formation radio;

a first conductive grid means for defining one surface of, and in electrical communication with, said plurality of conductive beads which is positioned closer to said inlet;

a second grid means electrically spaced from, and for defining another surface of said plurality of conductive beads which is positioned closer to said outlet.

14. An electrolytic cell as set forth in claim 13, further comprising:

a conductive metal flash coating of substantially uniform thickness formed atop said non-conductive core and beneath and prior to forming said first metallic support layer.

15. An electrolytic cell as set forth in claim 14, wherein each of said conductive beads further includes:

a metallic stabilizer layer of substantially uniform thickness formed atop said second metallic support layer, said stabilizer layer being a transition metal capable of a relatively high rate of hydrogen diffusion and a relatively low hydride formation ratio.

16. An electrolytic cell as set forth in claim 15, wherein:

said flash coating has a thickness in the range of 1 to 10 angstroms;

said first and second metallic support layers each have a thickness in the range of about 10 angstroms to 1 micron;

said metallic hydride forming layer has a thickness in the range of about 10 angstroms to 2 microns;

said stabilizer layer has a thickness in the range of about 1 to 60 angstroms.

17. An electrolytic cell as set forth in claim 15, wherein:

said flash coating is taken from the group consisting of: copper, palladium, nickel and titanium;

said metallic hydride forming layer is taken from the group consisting of:
palladium, lanthanum, praseodymium, cerium, titanium, zirconium, vanadium, tantalum, uranium, hafnium and thorium;

said first and second support layers are each taken from the group consisting of:
nickel, gold, silver and titanium; and said stabilizer layer is taken from the group consisting of: chromium, iron, cobalt, nickel and platinum.

18. An electrolytic cell as set forth in claim 13, further comprising:

a plurality of non-conductive beads positioned within said housing adjacent said second conductive grid means;

a foraminous non-conductive mesh means positioned within said housing between said conductive beads and said non-conductive beads for preventing said conductive beads from contacting said second conductive grid means.

19. An electrolytic cell as set forth in claim 13, further comprising:

a foraminous non-conductive mesh means positioned within said housing adjacent to and spaced from said second conductive grid means for preventing said conductive beads from contacting said second conductive grid means, said conductive beads being loosely packed within said electrolytic cell.

20. An electrolytic cell as set forth in claim 19, wherein:

said pumping means causes said liquid electrolyte to flow at a flow rate;

said conductive beads have an at-rest position when said flow rate is at or near zero;

said conductive beads are spaced apart and agitated at a rate proportional to said flow rate.

21. An electrolytic cell as set forth in claim 13, further comprising:

a conductive plate positioned within said housing defining said first conductive grid means;

said conductive beads adhered against and in electrical communication with said conductive plate;

a non-conductive spacer connected along two opposing edges of said conductive plate;

a plurality of conductive wire bands each connected around said spacers and defining said second electrode, said wire bands in electrical isolation from said conductive beads and said conductive plate.

22. An electrolytic as set forth in claim 13, wherein:

each said conductive bead is sized in the range of about 1 mm or less in diameter.

23. An electrolytic cell as set forth in claim 13, wherein:

said metallic hydride layer is taken from the group consisting of:
palladium, lanthanum, praseodymium, cerium, titanium, zirconium, vanadium, tantalum, uranium, hafnium and thorium.

24. An electrolytic cell as set forth in claim 13, further comprising:

a plurality of non-metallic beads each having ion exchange properties;

said plurality of non-metallic beads positioned between said second conductive grid means and said plurality of conductive beads;

said plurality of non-metallic microbeads forming a conductive salt bridge thereacross.

* * * * *